Feb. 27, 1962 R. GALLET 3,022,620
AUTOMATIC MACHINE FOR PACKING ARTICLES SUCH AS
BAGS IN THERMOWELDABLE POUCHES
Filed Nov. 14, 1960 6 Sheets-Sheet 1

Inventor
René Gallet
By Michael S. Striker
Attorney

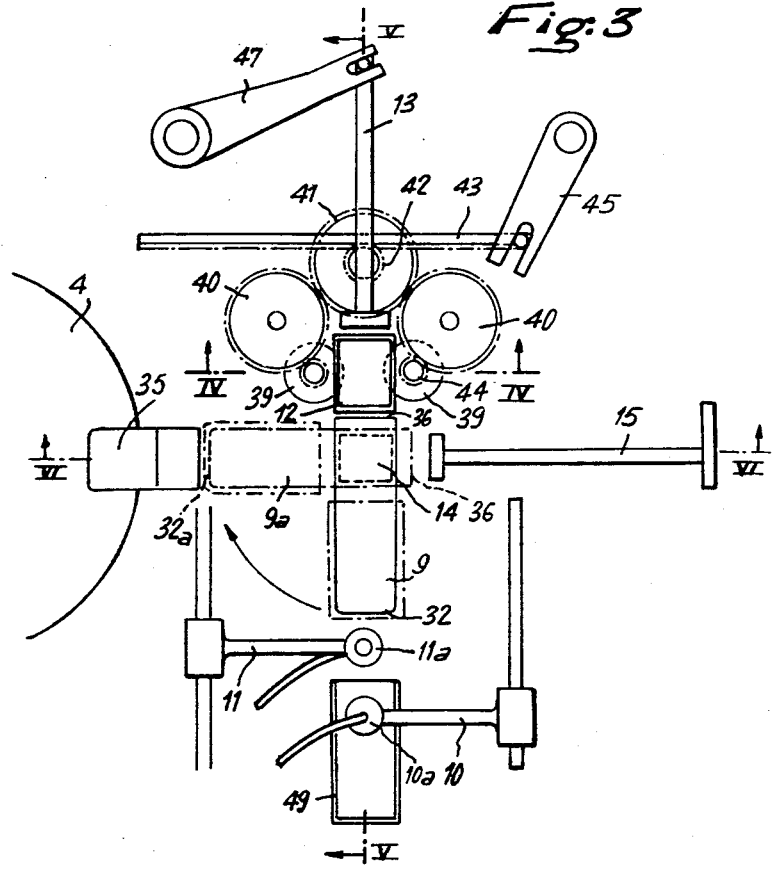
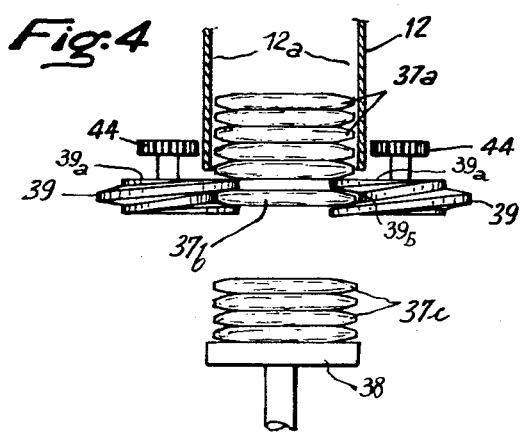

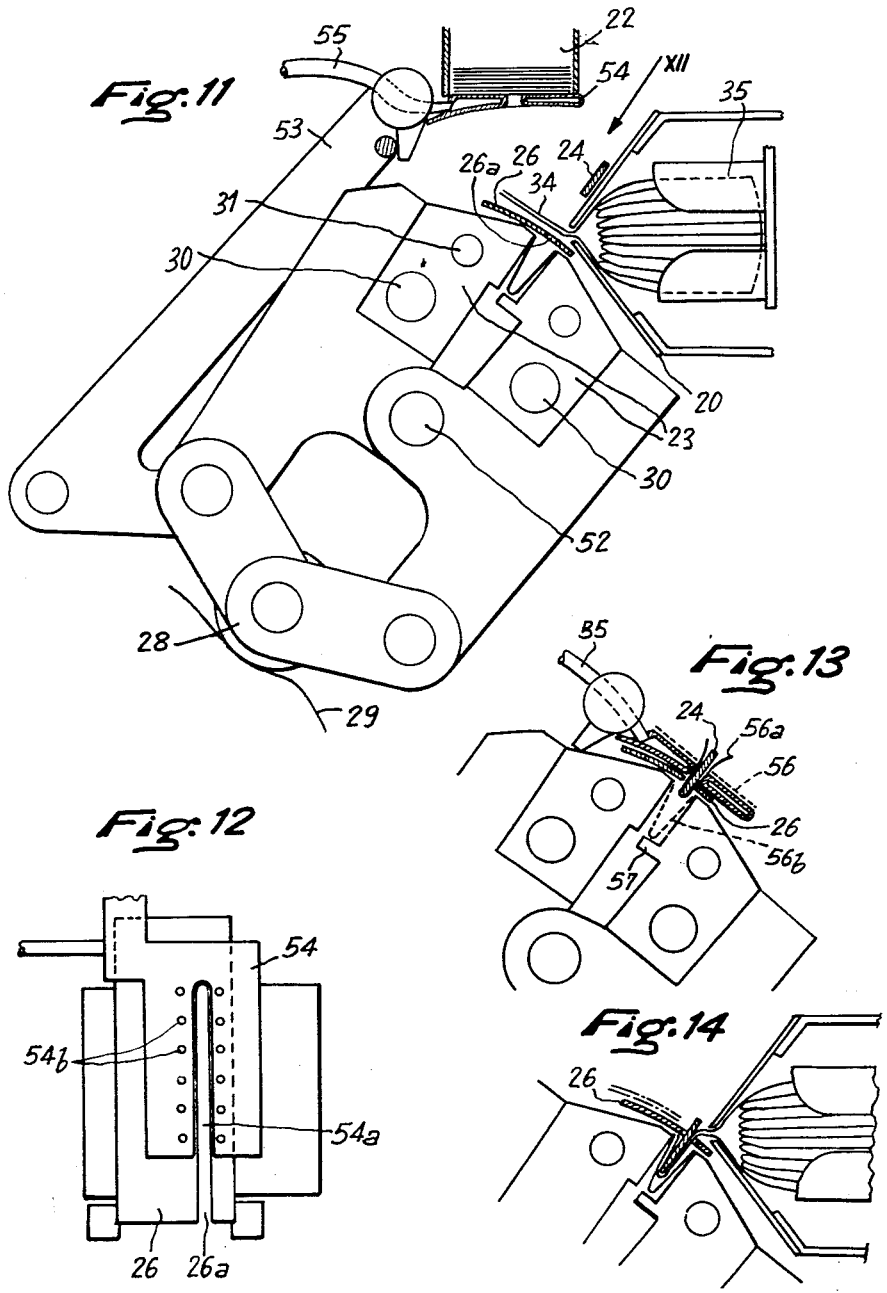

United States Patent Office 3,022,620
Patented Feb. 27, 1962

3,022,620
AUTOMATIC MACHINE FOR PACKING ARTICLES SUCH AS BAGS IN THERMOWELDABLE POUCHES
René Gallet, Sevres, France, assignor to Societe des Thes de l'Elephant, Marseille, France, a French company
Filed Nov. 14, 1960, Ser. No. 69,201
Claims priority, application France Nov. 17, 1959
10 Claims. (Cl. 53—137)

My invention has for its objects, a machine for packing articles such as bags, tablets, lozenges and the like inside pouches having a thermo-weldable opening, said machine being provided with four stations adapted to ensure respectively the introduction of the articles inside the pouches and the folding, the sealing and the delivery of the filled pouches. According to the present invention, these stations are distributed round a revolving plate. The pouch-filling or article-introducing station includes means for engaging a filling funnel a pouch previously removed from a magazine and held in its open condition, together with means for removing a predetermined number of articles out of a further magazine and pushing them into the funnel, means for urging the articles out of the funnel into the pouch engaging the latter, means for introducing the folded pouch into a chamber or recess formed radially on the revolving plate when registering with the funnel while the folding station is provided with means for folding the edges of the opening of the pouch, so as to form respectively as well known per se in two opposed walls of the pouch two flat bellows walls by means of two folding blades lying in a same plane between two pairs of co-operating parallel plates, the bellows walls obtained being connected through two flat walls, said folding means being associated with means holding against each other said flat walls except for a marginal strip which remains free in the vicinity of the opening of the pouch; as to the sealing station, it includes a pair of pivotally secured heating jaws, means for positioning in registry with said jaws, a label removed from a label magazine, means for folding the label into a gutter shape and for introducing the folded label between the jaws, means for introducing the free marginal strip of the walls of the pouch between the folded sides of the label and means for closing, heating, and reopening the jaws. Furthermore at least four chambers or recesses are provided on the revolving plate, which recesses are bounded by a lower wall adapted to rock round a horizontal axis and subjected to the action of a cam with a view to ensuring the exhaust through gravity of the finished pouch at the delivery station.

The accompanying drawings illustrate by way of example, a preferred embodiment of the invention. In said drawings:

FIG. 3 is a diagrammatic plan view of the pouch-filling station.

FIG. 4 is a partly sectional elevational view, corresponding to FIG. 3, the section line being the line IV—IV of FIG. 3.

FIG. 11 is an elevational, partly sectional view of the sealing station.

FIG. 12 is a view of said sealing station seen in the direction of the arrow XII drawn in FIG. 11.

FIG. 13 shows a detail of the sealing station at the moment of the folding of the label and of its introduction between its jaws.

FIG. 14 shows a similar detail of the sealing station at the moment of the folding of the free marginal strip of the pouch and of its introduction between the jaws.

Figure 1:
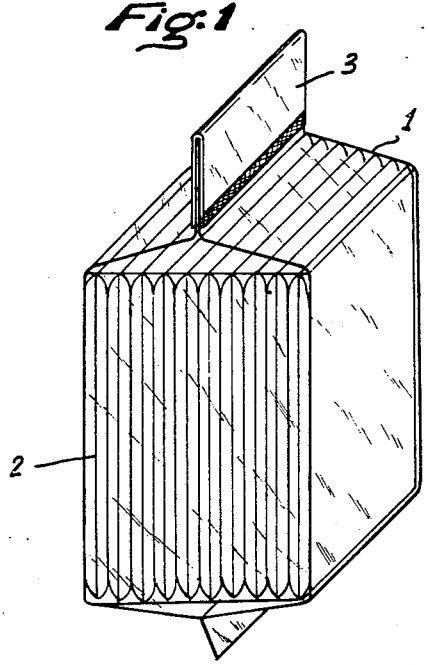
FIG. 1 is a perspective view of the finished filled pouch as it passes out of the machine, which pouch is sealed at a raised temperature and is made of transparent polyethylene said pouch provided with bellows containing a number of bags.

In FIG. 1, 1 designates the pouch of transparent polyethylene containing articles such as the bags 2 and carrying a label 3 arranged in overlapping position over its opening which has been sealed at a raised temperature, said label folded into the shape of a gutter being secured over said opening also through a sealing executed at a raised temperature.

Figure 2:
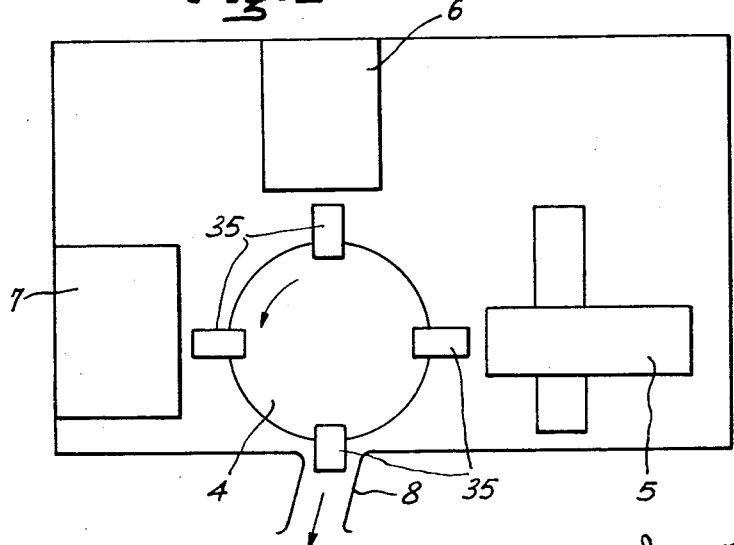
FIG. 2 is a diagrammatic plan view of the machine according to the invention.

In FIG. 2, the revolving plate 4 carries or is provided with four chambers or recesses 35 arranged in a manner such that its openings 36 may in succession register with the pouch-filling station 5, the folding station 6, the sealing station 7, and lastly the pouch-delivery station 8.

Figure 5:
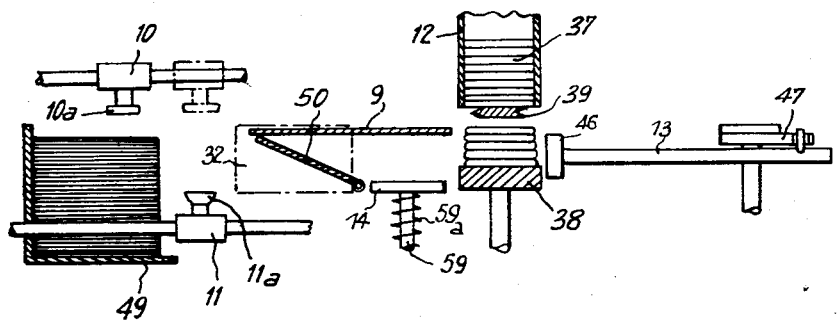
FIG. 5 is an elevational view partly sectional through line V—V of FIG. 3.

In FIGS. 3 to 5, the funnel 9 is shown as pivoting round an axis which is not illustrated and which is parallel with the axis of the revolving plate 4, so as to make its input ports 36 register first with the arrangement feeding the bags removed out of the magazine 12 while its output port 32 registers with an arrangement for feeding the pouches after which a pivotal movement through 90°, brings the same ports respectively into registry with a push member 15 and with a cooperating chamber 35 formed in the revolving plate.

The bag feeding means include a magazine 12, inside which bags 37 of a corresponding size are vertically stacked, the stack of bags resting on the upper ends 39a of two worms provided each with a trapezoidal thread 39 (FIG. 4), having a vertical axis and arranged on either side of the lower end of the magazine. Furthermore, a bottom 38 is adapted to slide vertically with reference to the magazine in coaxial relationship with the latter, in a manner such that it may occupy an upper position (FIG. 5) and a lower position (FIGS. 5a and 5b) for which the bags on said bottom lie substantially at the same level as and in horizontal registry with, on the one hand, the plate 14 forming the lower wall of the funnel and on the other hand the piston 46 which is adapted to push the bags into said funnel while the rod 13 carrying the piston 46 is controlled by a lever 47 operatively connected with the general mechanism driving the machine.

The two worms 39 are identical and are driven in the same rotary direction by a rack 43 (FIG. 3) operatively connected with the driving mechanism through the lever 45 and a cam which is not illustrated; the rack drives the pinion 42 coaxially rigid with the toothed wheel 41 which latter meshes with the toothed wheels 40 meshing in their turn with the pinions 44 rigid with the worms 39.

Said worms are provided as mentioned to either side of the magazine 12 and extend into horizontal registry with the latter so that the bottoms of the grooves formed by the threads 39b on them may be substantially tangent to the extensions of the two opposite walls 12a of the magazine. The pitch of their threads is of substantially the same magnitude as the thickness of the bags.

At the beginning of the bag feeding cycle, the bottom 38 is in its upper position and the bags 37 rest on the upper ends 39a of the worms 39. The latter, actuated by the rack 43 and the pinions and toothed wheels 42, 41, 40 and 44 in the desired direction carry along between the cooperating thread convolutions on said worms the lowermost bag 37b which is thus led towards the bottom 38 on which said bag drops under the action of gravity as shown at 37c (FIGS. 4 and 5). The successive bags form thus a stack on the bottom.

Figure 5A:
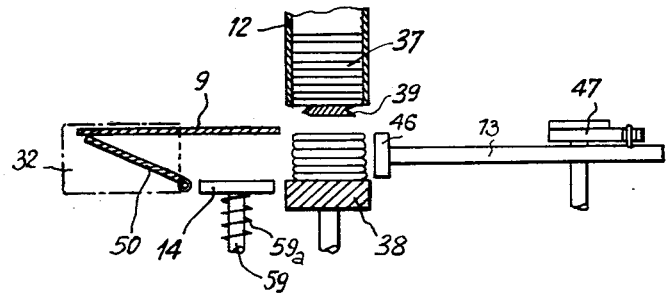
FIGS. 5a and 5b are partly sectional elevational views similar to FIG. 5 showing the relative arrangement of the parts at different moments of the operative cycle.
Figure 5B:
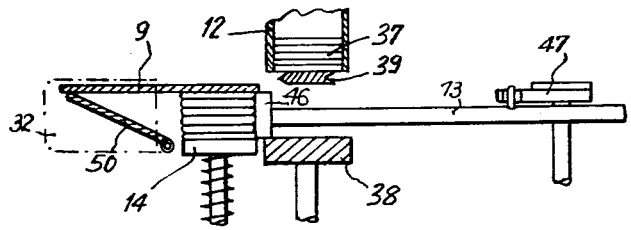

The bottom 38 is then lowered down to the level of the plate 14 as shown in FIG. 5a, so that the bags thereon may be shifted onto said plate by the piston 46 carried by the pusher rod 13 and controlled by the driving mechanism through the agency of the lever 47 which is subjected to the action of a cam which is not illustrated (FIG. 5b).

The piston 46 and then the bottom 38 return then into their starting positions, while the worms which are now driven in a direction opposed to their first above-mentioned movement under the action of a receding movement of the rack 43 towards its starting position return into the lower end of the stack in the magazine 12 the bags which have not been dropped onto the bottom 38 and which remain held between the threads of the worms as illustrated at 37b in FIG. 4 while subjecting said stack to thrusts which further the proper positioning of the bags inside the magazine and the uniform distribution of the product contained in the bags.

At the same time, the plate 14 carried by the rod 59 subjected to the antagonistic action of a cam which is not illustrated and of a return spring 59a rises so as to compress the bags against the upper wall of the funnel 9.

It is obvious that at the beginning of the above-described cycle, the cooperating effect of gravity and of the worms revolving in the suitable direction produces the engagement of the bags between the two groups of thread convolutions facing each other on said worms and then, after a number of revolutions equal to the number of convolutions on said worms, a number of bags equal to said number of revolutions is dropped onto the bottom 38. The arrangement allows thus, laying at each cycle on the bottom 38 a number of bags which is perfectly uniform.

During this bag-feeding operation, the lever 10 carrying at its end, a suction grip 10a operating pneumatically removes a pouch 32 from the upper end of a stack inside the magazine 49 and is shifted towards the funnel, so as to register with a similar lever 11 carrying a further pneumatic suction grip 11a which rises and adheres to the lower wall of the pouch after which it moves downwardly so as to open the opening in the latter; this being done, the two levers engage the opening over the output end of the funnel 9, and leave it there, while they return to their corresponding starting positions.

Figure 6:
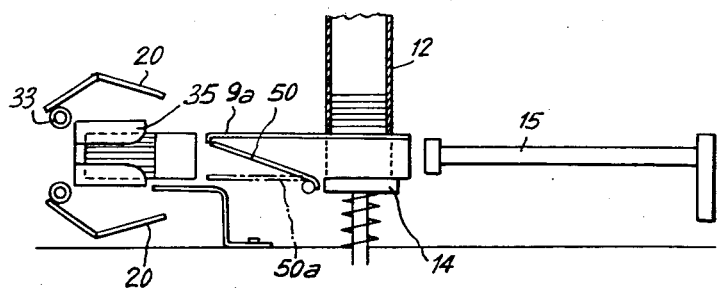
FIG. 6 is a cross-section through line VI—VI of FIG. 3.

The funnel 9 which pivots round a vertical axis coaxial with the rod 59 and which is parallel with the axis of the revolving plate, pivots then through 90° so as to make its input port 36 register with the pusher rod 15, as illustrated in FIG. 6, while its output port registers with the chamber 35 in the revolving plate. The plate 14 sinks then down to its starting level, and the pusher rod 15 urges the bags over the pivotal flap 50, forming the lower wall of the funnel ahead of its output port, said flap being urged into engagement with the upper wall of the funnel by a return spring which is not illustrated. The flap 50 sinks into the position 50a, drawn in dot-and-dash lines so as to allow the bags to pass, said bags being thus urged into the bottom of the pouch capping the output port of the funnel after which the pusher rod 15, continuing its travel urges the filled pouch into the chamber 35 formed radially on the revolving plate. This being done, the pusher rod 15 returns into its starting position.

Figure 7:
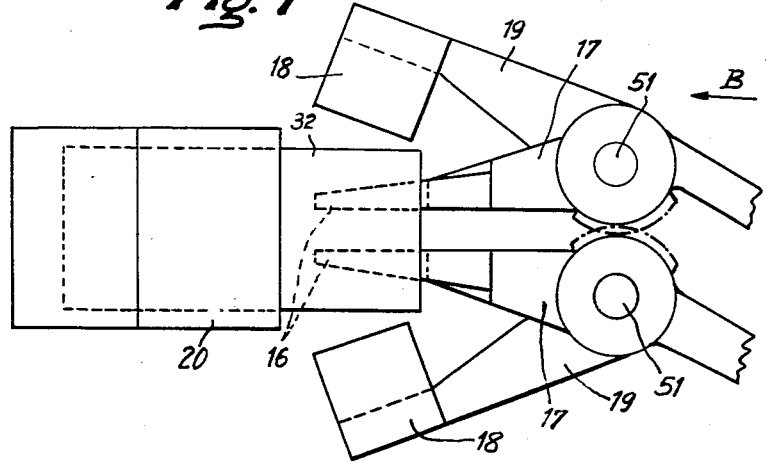
FIGS. 7 and 8 are plan views of the folding station at two different moments of its operative cycle.
Figure 8:
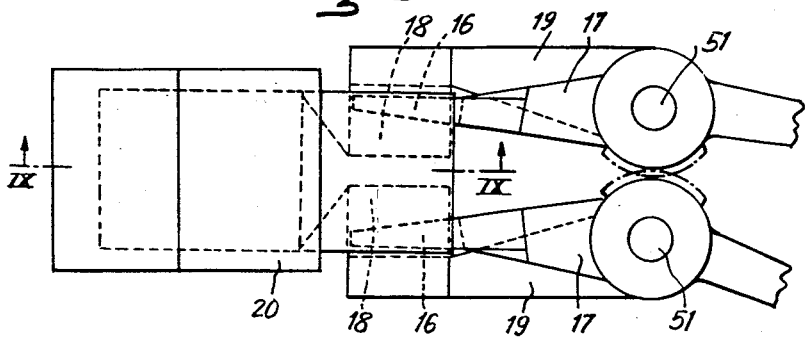
Figure 9:
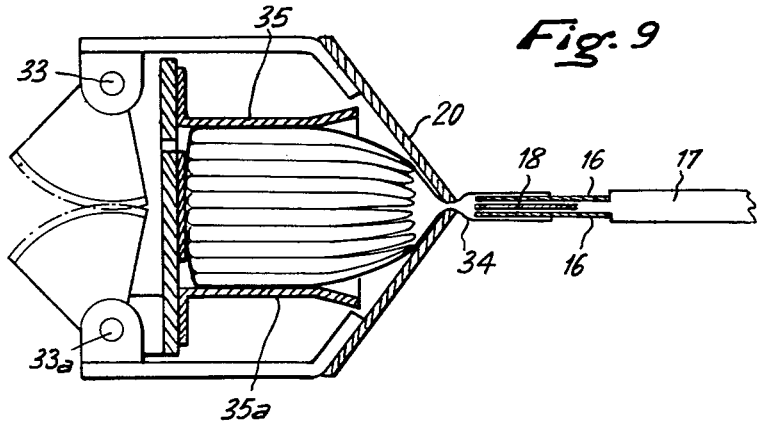
FIG. 9 is a cross-section on a larger scale through line IX—IX of FIG. 8, showing in particular the detail of a chamber and of the associated flaps.

In FIGS. 7, 8 and 9, the carrier pouch 32 fed at the bag filling station is shown as facing the folding station after a rotation through 90° of the revolving plate. This is followed by a radial translational movement of the folding arrangement in the direction of the arrow B, which movement makes the two pairs of plates 16 carried by arms 17 pivotally secured at 51 enter the opening in the pouch, said plates being controlled through the agency of a cam which is not illustrated.

Each arm 17 carries in fact, at its free end, a group or pair of two similar plates 16 showing parallel plane surfaces facing each other and separated by a gap inside which may be shifted the corresponding folding blade 18 carried by an arm 19 also pivotally carried at 51, independently of the arms 17, said folding blade 18 being controlled by a cam which is not illustrated.

The two arms 17 engaging the pouch move away from each other so that the plates 16 occupy the position illustrated in FIG. 8 with a spacing corresponding to the breadth of the opening of the pouch after folding while the arms 19 move towards teach other and introduce the blades 18 into the gap between the corresponding plates 16. During said movement, the blades 18 urge the wall of the bag into said gap between the plates 16 so as to form thus the folded bellows-shaped lateral walls of the pouch opening.

The two shaped flaps 20, which are pivotally secured each to one the spindles 33, forming projections on the rotary plate and extending perpendicularly to the medial radial direction of the chamber passing then through the folding station, are provided respectively above and underneath the chamber 35 and are controlled by a cam which is not illustrated, so as to close after the folding operation and to hold the opening of the pouch in its folded condition, while leaving a marginal strip 34 free adjacent said opening (FIG. 9). This being done, the whole folding mechanism is retracted in a direction opposed to the above-mentioned arrow B, so as to release the opening of the pouch with reference to the blades 18 and plates 16, and to allow its subsequent movement towards the sealing station.

The sealing station illustrated in FIGS. 11 to 14 includes jaws 23, pivotally secured at 52 and the closing of which is controlled by a toggle joint 28 cooperating with a cam 29. These jaws are heated by electric resistances 30, the temperature of which is controlled by a thermostat 31. Furthermore, the frame of the machine carries a protecting plate 26 provided in registry with the jaws and in the plane of contact between the edges of said jaws with a notch having parallel sides as shown at 26a. Furthermore, a blade 24 subjected to the action of a cam which is not illustrated, is adapted to move in said plane of contact between the edges of the jaws and is designed so as to engage the notch 26a, in a direction transverse with reference to the protecting plate 26.

Furthermore, a lever 53 controlled by a cam which is not illustrated, carries at its end a pneumatic suction grip 54, connected with a pipe 55 subjecting it to a reduced pressure. Said suction grip 54 is provided with a notch 54a similar to the notch 26a and which may be superposed over the latter upon pivotal motion of the lever 53; the suction grip 54 is provided with ports at 54b to either side of its notch 54a.

Before the pouch held inside the chamber 35 by the flaps 20 actually enters the sealing station, the suction grip 54 removes a label 56 from the bottom of a magazine 22 and sets it in registry with the notch 26a in parallel with the protecting plate 26 (FIG. 13) in a manner such that the line along which the label is to be folded coincides with the common direction of the notches. This being done, a plate 24 passing through the superposed notches folds the label as shown at 56a in FIG. 13, and urges it then into the gap between the jaws down to a stop 57 as also shown at 56b in FIG. 13 and, finally, said plate 24 recedes into its starting position outside the jaws. The label 56 remains in the position 56b in contact with the stop 57 as provided by the slight elastic tensioning exerted along its edges engaging the jaws.

The suction grip 54 rises then back into its starting position, and the chamber 35 carrying the pouch of which the opening is closed by the flaps 20 reaches a point in registry with the welding station, in a manner such that the free marginal strip 34 may cover the notch 26a and be held fast in said position (FIG. 11). The plate 24 passes now a second time through said notch 26a, as illustrated in FIG. 14 and introduces thus the marginal strip 34 into the gap between the jaws and inside the fold of the label so that the strip is folded along a line parallel with the outer edge of the pouch opening. The plate 24 recedes then and the jaws close so as to exert on the whole arrangement formed by the folded area adjacent the pouch opening and by the label thus capping said area, a suitable pressure during the time required for the sealing at a raised temperature. The jaws 23 open then wide so as to cooperate if required in the release of the label which may adhere thereto and which is held in the area adjacent the plane of contact between the jaws by the notch 26a. The latter extends in a direction such that the rotary movement of the revolving plate has for its result, the removal of the marginal strip of the pouch thus folded and sealed at a raised temperature along the longitudinal direction of said notch.

Figure 10:
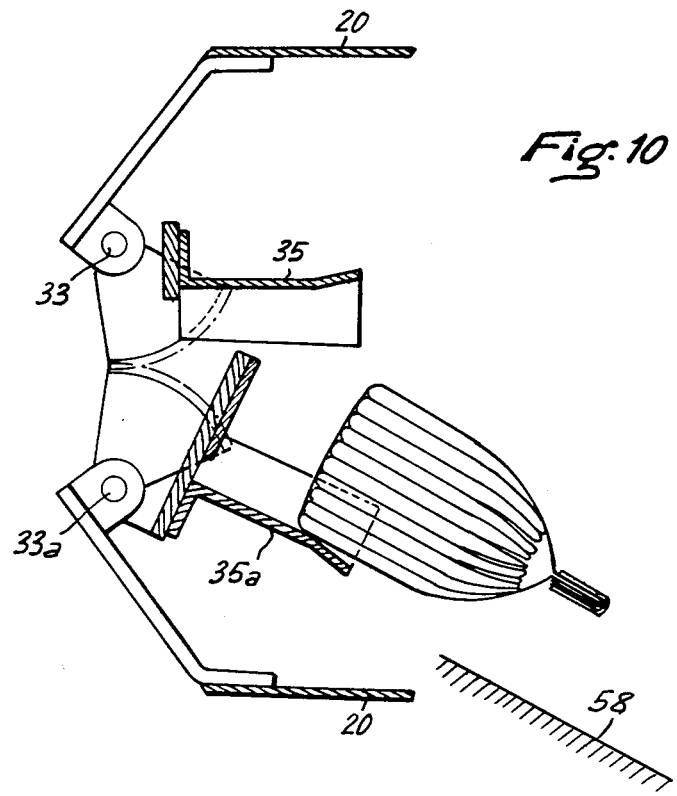
FIG. 10 is a similar cross-section of the chamber and of the flaps when reaching the pouch-removing system.

The revolving plate rotates then by one further quarter of a revolution, and brings finally the pouch in front of an opening through which it is delivered or removed through gravity. The lower wall 35a of the chamber 35, which pivots round the axis 35a as shown in FIG. 10, and which is connected operatively with a cam which is not illustrated, assumes then a sloping position while the flaps 20 open wide apart so as to allow the pouch to drop onto the sloping plane 58 over which the pouch is delivered under the action of gravity.

This being done, the lower wall 35a of the chamber returns into its starting position, while the chamber returns into registry with the pouch filling station so as to begin a further cycle of operation.

What I claim is:

1. A machine for packing articles such as bags, tablets, lozenges and the like inside pouches provided with flat transverse walls terminating at a thermo-weldable opening, comprising a plate revolving round a vertical axis and provided with a plurality of uniformly distributed, radially extending chambers and four stations distributed round the revolving plate and adapted to produce in succession and respectively, the filling of the pouch with articles, the folding of the filled pouch, the sealing of the opening in the pouch, and the removal of the sealed pouch, the first pouch-filling station including a filling funnel extending horizontally provided with an input port and with an output port in alignment, means for fitting over the output port of said funnel the pouch which is to be filled, means for taking a predetermined number of articles and urging them into the said funnel and through the latter into the pouch mounted on the funnel, and means for shifting the filled pouch away from the funnel into the chamber on the revolving plate when aligned radially with the funnel, the second, pouch-folding station including means for folding the edges of the pouch opening into bellows shape, the third sealing station including means for heating and sealing the opening of the pouch and means for removing at the pouch removing station, the filled, folded and sealed pouches.

2. A machine for packing articles such as bags, tablets, lozenges and the like, inside pouches provided with flat transverse walls terminating at a thermo-weldable opening, comprising a plate revolving round a vertical axis and provided with a plurality of uniformly distributed, radially extending chambers and four stations distributed round the revolving plate and adapted to produce in succession and respectively, the filling of the pouch with articles, the folding of the filled pouch, the sealing of the opening in the pouch, and the removal of the sealed pouch, the first pouch-filling station including a filling funnel extending horizontally, provided with an input port and with an output port in alignment and adapted to revolve round a vertical axis, a magazine containing a stack of pouches, a magazine containing a stack of articles, means for removing a pouch out of the stack of pouches in its magazine and fitting it over the output port of the funnel, means for shifting a predetermined number of articles out of the corresponding magazine into registry with the funnel, means for pushing said articles into the pouch mounted on the funnel, and means for shifting the filled pouch away from the funnel into the chamber on the revolving plate when aligned radially with the funnel, the second pouch-folding station including means for folding the edges of the pouch opening into bellows-shape, the third sealing station including means for heating and sealing the opening of the pouch and means for removing at the pouch removing station, the filled, folded and sealed pouches.

3. A machine for packing articles such as bags, tablets, lozenges and the like, inside pouches provided with flat transverse walls terminating at a thermo-weldable opening, comprising a plate revolving round a vertical axis and provided with a plurality or uniformly distributed, radially extending chambers and four stations distributed round the revolving plate and adapted to produce in succession and respectively, the filling of the pouch with articles, the folding of the filled pouch, the sealing of the opening in the pouch, and the removal of the sealed pouch, the first pouch-filling station including a filling funnel extending horizontally provided with an input port and with an output port in alignment and adapted to revolve round a vertical axis, means for fitting over the output port of said funnel the pouch which is to be filled, means for removing a predetermined number of articles and urging them into the said funnel and through the latter into the pouch mounted on the funnel, and means for shifting the filled pouch away from the funnel into the chamber on the revolving plate when aligned radially with the funnel, the second pouch-folding station including two co-planar folding blades adapted to move in their plane to engage two opposite flat walls of the pouch to form therein bellows surfaces interconnected by the remaining flat walls of the pouch, two pairs of parallel plates lying to either side of the path of said co-planar blades and between which the latter are shiftable between their wall-engaging and wall-disengaging positions, and cooperating means holding the flat walls of the pouch in contact with each other near the pouch opening just short of a marginal strip remaining free in the vicinity of the pouch opening in bellows shape, the third sealing station including means for heating and sealing the opening of the pouch and means for removing, at the pouch removing station, the filled, folded and sealed pouches.

4. A machine for packing articles such as bags, tablets, lozenges and the like, inside pouches provided with flat transverse walls terminating at a thermo-weldable opening, comprising a plate revolving round a vertical axis and provided with a plurality of uniformly distributed, radially extending chambers and four stations distributed round the revolving plate and adapted to produce, in succession and respectively, the filling of the pouch with bags, the folding of the filled pouch, the sealing of the opening in the pouch, and the removal of the sealed pouch, the first pouch-filling station including a filling funnel extending horizontally, provided with an input port and with an output port in alignment, and adapted to revolve round a vertical axis, means for fitting over the output port of said funnel the pouch which is to be filled, means for removing a predetermined number of articles and urging them into the said funnel and through the latter into the pouch mounted on the funnel, and means for shifting the filled pouch away from the funnel into the chamber on the revolving plate when aligned radially with the funnel, the second pouch-folding station including two co-planar folding blades adapted to move in their plane to engage two opposite flat walls of the pouch to form therein bellows surfaces interconnected by the remaining flat walls of the pouch, two pairs of parallel plates lying to either side of the path of said co-planar blades and between which the latter are shiftable between their wall-engaging and wall-disengaging positions, and cooperating means holding the flat walls of the pouch in contact with each other near the pouch opening just short of a marginal strip remaining free in the vicinity of the pouch opening in bellows-shape, the third sealing station including a pair of heated and pivotally secured jaws separated by a gap extending perpendicularly to the plane of symmetry of the sealing station passing through the axis of the revolving plate, a stack of labels, means folding and introducing the label out of said stack of labels into the gap between the jaws, means urging the free marginal strip of the pouch carried by the chamber registering with the sealing station inside the fold of the label between the jaws, and means for controlling in succession the closing of the jaws over said strip inside the label, the heating thereof, and the release of the jaws and means for removing at the pouch removing station, the filled, folded and sealed pouches.

5. A machine for packing articles such as bags, tablets, lozenges and the like, inside pouches provided with flat transverse walls terminating at a thermo-weldable opening, comprising a plate revolving round a vertical axis and provided with a plurality of uniformly distributed, radially extending chambers, each provided with a lower wall adapted to rock downwardly round a horizontal axis, and four stations distributed round the revolving plate and adapted to produce in succession and respectively, the filling of the pouch with articles, the folding of the filled pouch, the sealing of the opening in the pouch, and the removal of the sealed pouch, the first pouch-filling station including a filling funnel extending horizontally, provided with an input port and with an output port in alignment, and adapted to revolve round a vertical axis, means for fitting over the output port of said funnel the pouch which is to be filled, means for removing a predetermined number of articles and urging them into the said funnel and through the latter into the pouch mounted on the funnel, and means for shifting the filled pouch away from the funnel into the chamber on the revolving plate when aligned radially with the funnel, the second, pouch-folding station including means for folding the edges of the pouch opening into bellows-shape, the third sealing station including means for heating and sealing the opening of the pouch, a cam at the pouch-removing station adapted to control the rocking of said lower wall of the chamber, registering with the pouch removing station, and means for collecting the pouch dropping out of said chamber, upon rocking of its lower wall.

6. A machine for packing articles such as bags, tablets, lozenges and the like, inside pouches provided with flat transverse walls terminating at a thermo-weldable opening, comprising a plate revolving round a vertical axis and provided with a plurality of uniformly distributed, radially extending chambers and four stations distributed round the revolving plate and adapted to produce in succession and respectively, the filling of the pouch with articles, the folding of the filled pouch, the sealing of the opening in the pouch, and the removal of the sealed pouch, the first pouch-filling station including a filling funnel extending horizontally, provided with an input port and with an output port in alignment, and adapted to revolve round a vertical axis, a magazine containing a stack of pouches, a magazine containing a stack of articles and having a vertically slidable bottom, two vertical worms, the pitch of which is substantially equal to the thickness of the articles in the magazine and the upper ends of which carry the stacked articles inside the magazine above its bottom, the spacing of the worms being equal to the breadth of the articles, and means for rotating said worms first in one direction to make said articles follow the convolutions of the worm threads downwardly onto the magazine bottom, and then in the opposite direction to raise the articles still carried by the worms into position in their magazine, means for controlling the reciprocation of the bottom to make it move between an upper position in which it receives the articles dropped onto it and a lower position for which said articles register with the input port of the funnel, means adapted to urge the articles lying on the bottom of the magazine in its lowermost position into the funnel, means for removing a pouch out of the stack of pouches and fitting it over the output port of the funnel, means for pushing the articles in the funnel into the pouch mounted on the latter, and means for shifting the filled pouch away from the funnel into the chamber on the revolving plate when aligned radially with the funnel, the second pouch-folding station including means for folding the edges of the pouch opening into bellows shape, the third sealing station including means for heating and sealing the opening of the pouch and means for removing at the pouch removing station the filled, folded and sealed pouches.

7. A machine for packing articles such as bags, tablets, lozenges and the like, inside pouches provided with flat transverse walls terminating at a thermo-weldable opening, comprising a plate revolving round a vertical axis and provided with a plurality of uniformly distributed, radially extending chambers and four stations distributed round the revolving plate and adapted to produce in succession and respectively, the filling of the pouch with articles, the folding of the filled pouch, the sealing of the opening in the pouch and the removal of the sealed pouch, the first pouch-filling station including a filling funnel extending horizontally, provided with an input port and with an output port in alignment and adapted to revolve round a vertical axis, a magazine containing a stack of pouches, a magazine containing a stack of articles, a push member facing the chamber registering with the article filling station, means controlling the rotation of the funnel round its axis between a first and a second position for the first of which said funnel registers through its input and output ports respectively with the article magazine and with the pouch magazine, the input and output ports of the funnel registering for the second position respectively with the push member and with the location of the chamber facing the pouch-filling station, which is to receive the filled pouch, suction means adapted to draw a pouch out of the pouch magazine into a position registering with the location of the output port of the funnel in its first position to fit the pouch over said output port, means for shifting a predetermined number of articles out of the corresponding magazine into the input port of the funnel in its first position, means whereby the push member pushes said articles into the pouch mounted on the funnel and shifts the filled pouch away from the funnel in its second position into the chamber on the revolving plate when aligned radially with the funnel, the second pouch-folding station including means for folding the edges of the pouch opening into bellows-shape, the third sealing station including means for heating and sealing the opening of the pouch and means for removing at the pouch removing station, the filled, folded and sealed pouches.

8. A machine for packing articles such as bags, tablets, lozenges and the like, inside pouches provided with flat transverse walls terminating at a thermo-weldable opening, comprising a plate revolving round a vertical axis and provided with a plurality of uniformly distributed, radially extending chambers and four stations distributed round the revolving plate and adapted to produce in succession and respectively, the filling of the pouch with articles, the folding of the filled pouch, the sealing of the opening in the pouch and the removal of the sealed pouch, the first pouch-filling station including a filling funnel extending horizontally, provided with an input port and with an output port in alignment, a magazine containing a stack of pouches, a magazine containing a stack of articles, means for removing a pouch out of the stack of pouches in its magazine and fitting it over the output port of the funnel, an auxiliary horizontal plate incorporated with the lower wall of the funnel and adapted to slide vertically in front of the input port of the funnel, means adapted to introduce the articles from the magazine bottom onto the auxiliary plate and thence into the pouch mounted on the funnel and then the filled pouch into the chamber carried by the plate in registry with the pouch filling station, a cam and a return spring acting in opposite directions on said auxiliary plate to make it move vertically upwardly to urge transiently the articles fed on to said auxiliary plate towards the upper wall of the funnel, a flap also incorporated with the lower wall of the funnel near the output end of the funnel and pivotally secured round a horizontal axis extending transversely across the funnel, a spring urging said flap upwardly into engagement with the upper wall of the funnel and adapted to recede under the action of the articles introduced by the push member, the second pouch-folding station including means for folding the edges of the pouch opening into bellows-shape, the third sealing station including means for heating and sealing the opening of the pouch and means for removing at the pouch removing station, the filled, folded and sealed pouches.

9. A machine for packing articles such as bags, tablets, lozenges and the like, inside pouches provided with flat transverse walls terminating at a thermo-weldable opening, comprising a plate revolving round a vertical axis and provided with a plurality of uniformly distributed, radially extending chambers, two shaped flaps pivotally secured over and under each chamber round axes perpendicular to the medial vertical plane of symmetry of the chamber and adapted to enclose the latter over the pouch therein, a lever controlling said shaped flaps, a cam-follower carried by said lever, and four stations distributed round the revolving plate and adapted to produce in succession and respectively, the filling of the pouch with articles, the folding of the filled pouch, the sealing of the opening in the pouch, and the removal of the sealed pouch, the first pouch-filling station including a filling funnel extending horizontally, provided with an input port and with an output port in alignment, means for fitting over the output port of said funnel the pouch which is to be filled, means for removing a predetermined number of articles and urging them into the said funnel and through the latter into the pouch mounted on the funnel, and means for shifting the filled pouch away from the funnel into the chamber on the revolving plate when aligned radially with the funnel, the second pouch-folding station including two co-planar folding blades adapted to move in their plane to engage two opposite flat walls of the pouch to form therein bellows surfaces interconnected by the remaining flat walls of the pouch, two pairs of parallel plates lying to either side of the path of said co-planar blades and between which the latter are shiftable between their wall-engaging and wall-disengaging positions, and cooperating means holding the flat walls of the pouch in contact with each other near the pouch opening just short of a marginal strip remaining free in the vicinity of the pouch opening in bellows shape, the third sealing station including means for heating and sealing the opening of the pouch, a stationary cam adapted to control the angular positions of the shaped flaps through said cam follower and lever to close them over the pouch just after the end of the folding of the latter before the return of the folding blades into their disengaging position and to open said flaps apart after sealing of the pouch at the sealing station and means for removing, at the pouch removing station, the filled, folded and sealed pouches.

10. A machine for packing articles such as bags, tablets, lozenges and the like, inside pouches provided with flat transverse walls terminating at a thermo-weldable opening, comprising a plate revolving round a vertical axis and provided with a plurality of uniformly distributed, radially extending chambers and four stations distributed round the revolving plate and adapted to produce in succession and respectively, the filling of the pouch with articles, the folding of the filled pouch, the sealing of the opening in the pouch, and the removal of the sealed pouch, the first pouch-filling station including a filling funnel extending horizontally provided with an input port and with an output port in alignment, means for fitting over the output port of said funnel the pouch which is to be filled, means for removing a predetermined number of articles and urging them into the said funnel and through the latter into the pouch mounted on the funnel, and means for shifting the filled pouch away from the funnel into the chamber on the revolving plate when aligned radially with the funnel, the second pouch-folding station including two co-planar folding blades adapted to move in their plane to engage two opposite flat walls of the pouch to form therein bellows surfaces interconnected by the remaining flat walls of the pouch, two pairs of parallel plates lying to either side of the path of said co-planar blades and between which the latter are shiftable between their wall-engaging and wall-disengaging positions, and cooperating means holding the flat walls of the pouch in contact with each other near the pouch opening just short of a marginal strip remaining free in the vicinity of the pouch opening in bellows shape, the third sealing station including a pair of jaws separated by a gap extending in a plane perpendicular to a plane passing through the axis of the revolving plate and through the sealing station, a stop in the gap between the jaws, a stationary protecting plate provided with a slot in registry with the gap between the jaws lying in the plane of contact between said jaws, in front of the location of the marginal strip of the pouch facing the sealing station, a magazine containing a stack of labels, suction means including a plate provided with suction ports and with a slot extending longitudinally thereof, means for shifting said suction means off the stack of labels to remove a label into a position for which its slot registers with the slot in the stationary plate, a folding blade, a cam controlling the latter and urging it twice in succession into the gap formed between the jaws to first enter the label in a folded condition between said jaws down to the stop between the latter, and a second time for the folding and introduction into said gap and inside the fold of the label of the marginal strip of the pouch carried by the chamber registering with the sealing station, and means controlling the movement of the jaws towards and away from each other to make them first hold the marginal section of the article and the label thereon to seal the label over the marginal strip and then to move them apart to allow the further movement of the sealed pouch with its chamber and means for removing, at the pouch removing station, the filled, folded and sealed pouches.

No references cited.